J. SHARP.
COMBINATION NUT LOCK.
APPLICATION FILED JAN. 28, 1908.

925,602.

Patented June 22, 1909.

INVENTOR
JOHN SHARP.
BY
*J. Clyde Hizar*
ATTORNEY

UNITED STATES PATENT OFFICE.

JOHN SHARP, OF SAN DIEGO, CALIFORNIA, ASSIGNOR OF ONE-HALF TO HENRY P. CHIGBROW, OF SAN DIEGO, CALIFORNIA.

COMBINATION NUT-LOCK.

No. 925,602.  Specification of Letters Patent.  Patented June 22, 1909.

Application filed January 28, 1908. Serial No. 412,978.

*To all whom it may concern:*

Be it known that I, JOHN SHARP, a citizen of the United States, residing at San Diego, in the county of San Diego, State of California, have invented certain new and useful Improvements in Combination Nut-Locks, of which the following is a specification:

This invention relates to a combination of a nut and gasket, or washer, the washer being made of rubber, asbestos or other compositions which contain an elastic substance, and has for its object to produce a simple, effective device of this character which may be readily applied to any class of bolts or threaded rods now in general use, without necessitating changes in the construction of the threads, or other parts of the bolt. The standard nut as produced by the manufacturer may readily be conformed to the shape required to receive the gasket or composition collar which is claimed to be the attachment to the nut for breaking the vibration of the workings of the plate from between the face of the nut and the article to which the nut is applied by connection of the bolt.

With these and other features in view the invention comprises the novel features of construction and combination of parts more fully hereinafter described.

Figure 1:
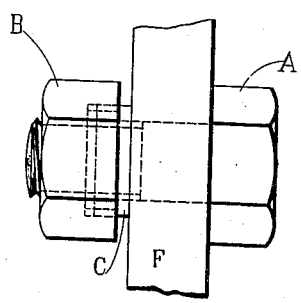
Figure 2:
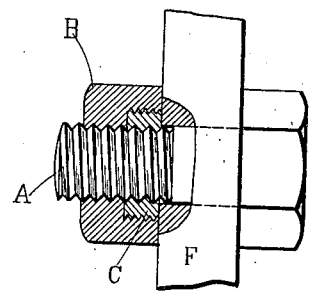
Figure 3:
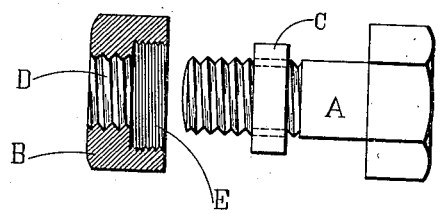
Figure 4:
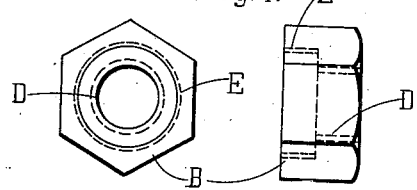
Figure 5:
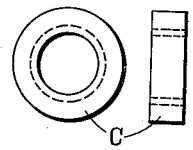

In the accompanying drawings Figure 1 is a side view of a bolt with the nut and collar or gasket attached, dotted lines representing the gasket or collar and the inner cavity of the nut which receives the gasket with the nut relieved from the timber or plate showing the required extensions of the gasket that will form the compression between the nut and plate when drawn down solid to the plate. This collar or gasket is intended to break the vibration between the nut and plate, thus preventing it from slipping or turning. Also the object of the gasket is to prevent the oil from leading in the threads to the face of the nut, thus preventing the nut from being loosened by the application of the oil. Fig. 2 is a side and sectional view of the bolt, plate, and nut with the nut drawn solid to the plate for the purpose of showing the position of the gasket or composition collar in the cavity of the nut when in a working position. This inner cavity of the nut is threaded for the purpose of holding the gasket in a firm position when detaching the nut from the bolt. Fig. 3 shows a side and sectional view of a bolt with the gasket or collar attached, and the nut detached. The sectional view of the nut shows one method of making a nut of this kind with the inner cavity exposed, showing the form and manner of construction. Fig. 4 shows a side and top view of the nut the dotted lines representing a threaded portion of the nut both top and bottom, and the inner cavity of the nut which contains the gasket. Fig. 5 shows a top and side view of the gasket as constructed for use, the dotted lines representing the impression of the thread.

Similar letters refer to similar parts throughout the several views.

A. is the bolt, provided with threads, to which nut B is attached.

E is the inner cavity of the nut B, which contains the gasket C.

C. is the gasket or collar which is shown in each of the different views in different positions.

In attaining these ends, it is to be understood that minor changes in the form, proportions, and general assemblage of the parts herein set forth may be resorted to without departing from the spirit of the invention.

Having thus described my invention, what I claim as new and desire to protect by Letters Patent is,—

In a nut lock, the combination of a metallic nut, provided with an annular threaded cavity, an elastic annular gasket to screw tightly into said cavity and project beyond said nut when in, both nut and gasket threaded to receive a threaded bolt, and said bolt, all substantially as set forth.

JOHN SHARP.

Witnesses:
J. W. MASTER,
RUDOLF HASELBAUER.